(12) United States Patent
Murayama

(10) Patent No.: US 9,260,100 B2
(45) Date of Patent: Feb. 16, 2016

(54) PRESSURE CONTROL RESERVOIR WITH CHECK VALVE

(71) Applicants: DENSO CORPORATION, Kariya, Aichi-pref. (JP); Advics Co., Ltd., Kariya, Aichi-pref. (JP)

(72) Inventor: Takashi Murayama, Kariya (JP)

(73) Assignees: DENSO CORPORATION, Kariya, Aichi-pref. (JP); ADVICS CO., LTD., Kariya, Aichi-pref. (JP)

(*) Notice: Subject to any disclaimer, the term of this patent is extended or adjusted under 35 U.S.C. 154(b) by 71 days.

(21) Appl. No.: 14/063,298

(22) Filed: Oct. 25, 2013

(65) Prior Publication Data

US 2014/0116244 A1  May 1, 2014

(30) Foreign Application Priority Data

Oct. 26, 2012 (JP) ................................. 2012-236996

(51) Int. Cl.
| | |
|---|---|
| B60T 8/42 | (2006.01) |
| B60T 17/06 | (2006.01) |
| B60T 13/14 | (2006.01) |
| B60T 13/68 | (2006.01) |
| B60T 8/36 | (2006.01) |
| B60T 8/48 | (2006.01) |

(52) U.S. Cl.
CPC ............. B60T 17/06 (2013.01); B60T 8/368 (2013.01); B60T 8/4872 (2013.01); B60T 13/147 (2013.01); B60T 13/686 (2013.01)

(58) Field of Classification Search
CPC . Y10T 137/7826; B60T 8/4872; B60T 8/341; B60T 8/4233; B60T 8/4881; B60T 817/06
See application file for complete search history.

(56) References Cited

U.S. PATENT DOCUMENTS

| | | | | |
|---|---|---|---|---|
| 5,538,336 | A * | 7/1996 | Reuter et al. | 303/119.2 |
| 7,543,896 | B2 * | 6/2009 | Ariki et al. | 303/115.4 |
| 8,215,724 | B2 * | 7/2012 | Aoba et al. | 303/115.4 |
| 2006/0091725 | A1 | 5/2006 | Ariki et al. | |
| 2008/0136250 | A1* | 6/2008 | Ganzel | 303/11 |
| 2010/0244553 | A1 | 9/2010 | Oosawa | |
| 2012/0139333 | A1* | 6/2012 | Terashima | 303/115.1 |
| 2013/0088076 | A1 | 4/2013 | Oosawa | |

FOREIGN PATENT DOCUMENTS

| | | |
|---|---|---|
| JP | 2670340 | 7/1997 |
| JP | 2006-151362 | 6/2006 |
| JP | 2010-221890 | 10/2010 |

* cited by examiner

Primary Examiner — Bradley King
Assistant Examiner — Stephen Bowes
(74) Attorney, Agent, or Firm — Harness, Dickey & Pierce, P.L.C.

(57) ABSTRACT

A pressure control reservoir for a vehicle brake system is disposed in a hydraulic line extending from a master cylinder to a wheel cylinder through a pump. The pressure control reservoir includes a check valve which consists of a valve seat and a valve. The check valve is closed when an excessive pressure of brake fluid produced by the master cylinder. The valve is stationary. The valve seat is moved in response to an elevated level of the pressure of brake fluid into engagement with the valve, so that the check valve is closed. With these arrangements, the check valve is closed before a piston starts to move to change the volume of a reservoir chamber, thus permitting the volume of the brake fluid required to close the check valve to be decreased, which minimizes the uncomfortable feeling given to a driver of the vehicle when actuating the brakes.

10 Claims, 8 Drawing Sheets

PRESSURE CONTROL RESERVOIR WITH CHECK VALVE

CROSS REFERENCE TO RELATED DOCUMENT

The present application claims the benefit of priority of Japanese Patent Application No. 2012-236996 filed on Oct. 26, 2012, the disclosure of which is incorporated herein by reference.

BACKGROUND OF THE INVENTION

1. Technical Field of the Invention

This disclosure relates generally to a structure of a pressure control reservoir with a check valve through which a brake fluid flows to a wheel cylinder (W/C) in a brake fluid pressure control mode, for example, in an antilock brake system (ABS).

2. Background Art

Japanese Patent No. 2670340 teaches a brake system for automotive vehicles which is equipped with a pressure control reservoir (also called a switch reservoir). The pressure control reservoir works to store brake fluid, as drained from wheel cylinders, in an ABS (Antilock Brake System) control mode, to control increasing of pressure in the wheel cylinders to avoid skidding of the wheels. The pressure control reservoir is also coupled to a master cylinder (M/C) and works to deliver the brake fluid, as supplied form the master cylinder, to a pump while controlling a difference in pressure between the master cylinder and an inlet of the pump in a traction control mode. The pressure control reservoir is equipped with a check valve of a normally open type which is closed when the pressure in the master cylinder is being increased and opened in the traction control mode. The check valve serves to avoid the exertion of an excessive pressure, as produced by a driver's braking operation in the master cylinder, on the pressure control reservoir and also ensures the stability in supplying the brake fluid to the pump in the traction control mode.

When the driver of the vehicle performs the braking operation to generate a braking force, a piston in the pressure control reservoir needs to be moved to close the check valve before the brakes are actually applied to the wheels. This consumes a volume of the brake fluid required to move the piston in the pressure control reservoir, thus resulting in a lag in start of actual work of the brakes. Specifically, a time lag occurs between the driver's actuation of the brake and the start of actually braking the wheels, which may cause the driver to think that braking the wheel requires more effort on the brake.

SUMMARY OF THE INVENTION

It is therefore an object of this disclosure to provide a pressure control reservoir which is designed to close a check valve with a decreased volume of brake fluid in order to alleviate an uncomfortable feeling the driver experiences when braking a vehicle.

According to one aspect of the invention, there is provided a pressure control reservoir for use in a vehicle, such as an automotive vehicle, equipped a brake system which includes a brake actuating member, a brake fluid pressure generator, and a braking force generator. The brake fluid pressure generator works to elevate pressure of brake fluid in response to an operation of the brake actuating member. The brake force generator is coupled to the brake fluid pressure generator through a main hydraulic line (A) and works to produce a braking force to be exerted on a wheel in response to the elevated pressure of brake fluid, as provided by the brake fluid pressure generator. The pressure control reservoir comprises: (a) a housing; (b) a first reservoir port which is formed in the housing and to which the brake fluid is inputted from the brake fluid pressure generator through a fluid inlet line; (c) a second reservoir port which is formed in the housing and leads to an inlet of a pump through a fluid outlet line; (d) a reservoir chamber which is formed in the housing and is to communicate with the fluid inlet line and the fluid outlet line, the reservoir chamber working to store the brake fluid and selectively establishing fluid communication with the inlet of the pump through the second reservoir port, the pump serving to suck the brake fluid from the reservoir chamber and discharge the brake fluid to the brake force generator; (e) a chamber which is formed in the housing and into which the first reservoir port and the second reservoir port open, the first reservoir port being to establish fluid communication of the reservoir chamber with the fluid inlet line, the second reservoir port being to establish fluid communication of the reservoir chamber with the fluid outlet line; (f) a hydraulic path through which the brake fluid flows from the fluid inlet line to the reservoir chamber; (g) a valve assembly which is disposed in the chamber and works as a check valve, the valve assembly including a valve and a valve seat with a seat surface to selectively block the hydraulic path; and (h) a piston which includes a piston body which is movable to change a volume of the reservoir chamber and a spring which is located farther away from the reservoir chamber than the piston body is and urges the piston body so as to decrease the volume of the reservoir chamber. When the brake fluid pressure generator produces no pressure of the brake fluid, the valve seat is located away from the valve to open the check valve, thereby opening the hydraulic path. Alternatively, when the brake fluid pressure generator elevates the pressure of the brake fluid, and the pump is at rest, the valve seat is moved in response to the elevated pressure of the brake fluid to close the check valve, thereby blocking the hydraulic path.

Specifically, when the pressure of the brake fluid, as elevated by the brake fluid pressure generator, has reached a given level, an assembly of the valve seat, as described above, travels into engagement with the valve which is held from moving for closing the check valve. With this arrangement, the level of pressure at which the piston body starts to move to change the volume of the reservoir chamber is higher than the level of the pressure of the brake fluid at the end of movement of the valve assembly (i.e., the valve seat), that is, the level of the pressure of the brake fluid when the check valve is closed. The check valve is, therefore, closed before the piston starts to move, thus permitting the volume of the brake fluid required to close the check valve to be decreased, which minimizes the uncomfortable feeling given to the driver when actuating the brakes.

In the preferred mode of the embodiment, the chamber may include a first chamber which leads to the first reservoir port and in which the valve assembly is disposed and a second chamber in which the piston is disposed. The valve assembly may include a pressure control piston which is movable in the first chamber and in which a portion of the hydraulic path is formed, the valve seat which is joined to a portion of the pressure control piston which faces the piston, in which a portion of the hydraulic path is formed, and has the seat surface formed thereon, and the valve which is disposed inside the portion of the hydraulic path in the pressure control piston and selectively rests on the seat surface of the valve seat to block the hydraulic path. The valve and the valve seat serves as the check valve. The pressure control reservoir also includes a pin disposed in the hydraulic path. When the brake fluid pressure generator produces no brake fluid pressure, the pin retains the valve away from the seat surface of the valve seat to open the check valve, thereby opening the hydraulic path. Alternatively, when the brake fluid pressure generator elevates the pressure of the brake fluid, and the pump is at rest, the pressure control piston is moved along with the valve seat toward the valve, so that the valve rests on the seat surface of the valve seat in response to the pressure of the brake fluid to close the check valve, thereby blocking the hydraulic path.

The chamber may be designed to have an inner shoulder which defines the first chamber and the second chamber continuing from the first chamber. The first chamber and the second chamber have longitudinal center lines extending in parallel to each other. The first chamber is located more upstream of a flow of the brake fluid from the first reservoir port to the second reservoir port than the second chamber is.

The valve assembly may be designed as a single unit which includes a casing in which the pressure control piston, the valve seat, and the valve are disposed. The casing has an inner wall with which the pressure control piston is movable in slidable contact and the pin secured thereto.

The valve assembly may alternatively be designed to have a pressure control piston which is movable in the first chamber and equipped with a valve portion with a valve surface formed on a periphery thereof. The valve surface selectively closes and opens the first reservoir port to constitute the check valve. When the brake fluid pressure generator produces no pressure of the brake fluid, the pressure control piston is located close to the piston, so that the valve portion opens the first reservoir port, meaning that the check valve is opened. Alternatively, when the brake fluid pressure generator elevates the pressure of the brake fluid, and the pump is at rest, the pressure control piston is moved away from the piston, so that the valve portion closes the first reservoir port, meaning that the check valve is closed.

The first chamber and the second chamber may alternatively be designed to have longitudinal center lines extending in non-parallel to each other. The first chamber has an inner peripheral wall in which the first reservoir port is formed and also has the valve assembly disposed therein. The second chamber has the piston disposed therein. The valve assembly includes a pressure control piston which is movable in the first chamber and in which a portion of the hydraulic path is formed, the valve seat which is joined to a portion the pressure control piston which faces the piston, in which a portion of the hydraulic path is formed, and has the seat surface formed thereon, and the valve which is disposed inside the portion of the hydraulic path in the pressure control piston and selectively rests on the seat surface of the valve seat to block the hydraulic path. The valve and the valve seat serves as the check valve. The pressure control reservoir also includes a pin which retains the valve. When the brake fluid pressure generator produces no pressure of the brake fluid, the pin holds the pressure control piston and the valve seat away from the valve to open the check valve, thereby opening the hydraulic path. Alternatively, when the brake fluid pressure generator elevates the pressure of the brake fluid, and the pump is at rest, the pressure control piston and the valve seat are moved toward the valve, so that the valve rests on the seat surface of the valve seat in response to the pressure of the brake fluid to close the check valve, thereby blocking the hydraulic path.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
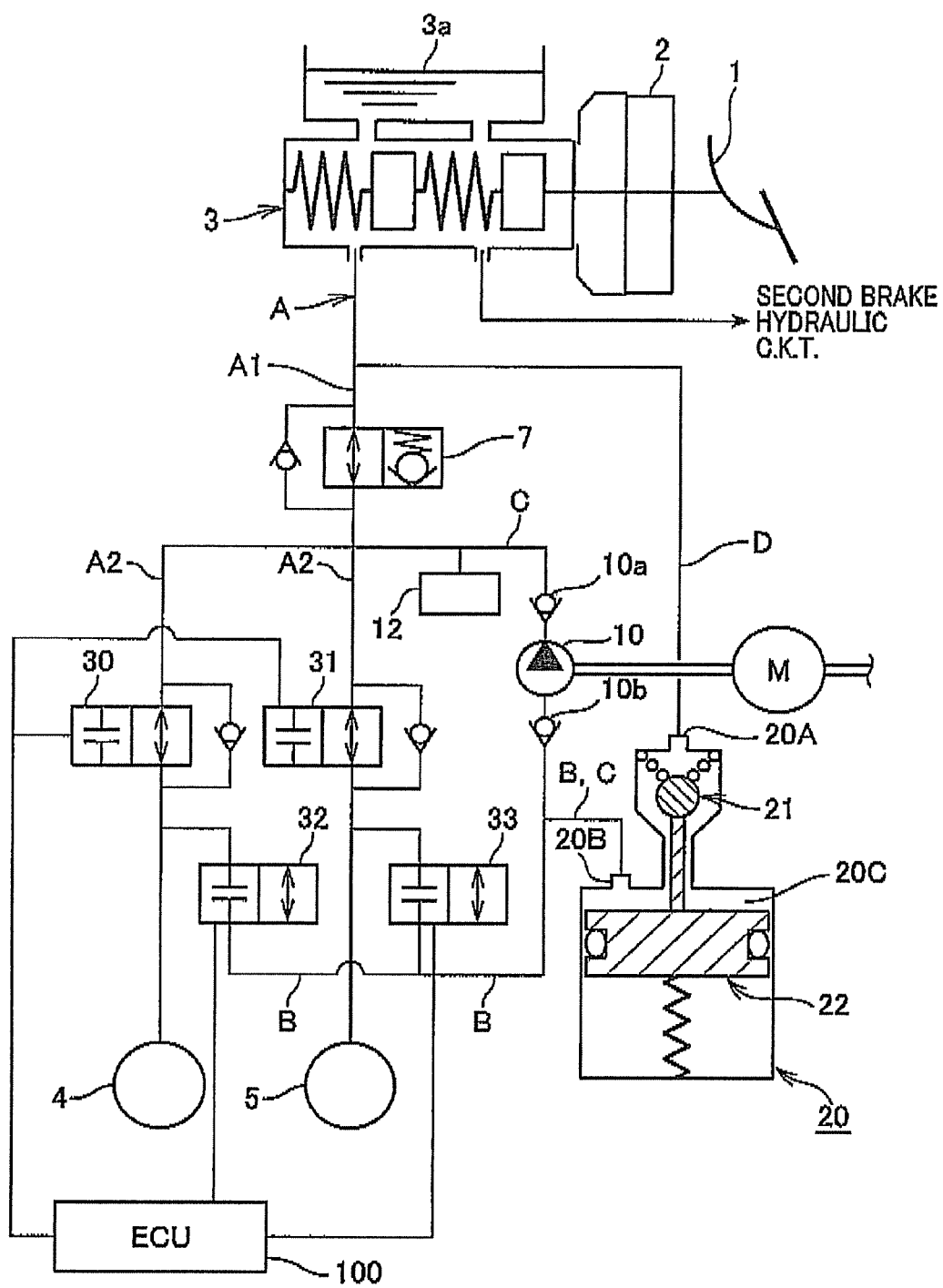
FIG. 1 is a circuit diagram which illustrates a brake system equipped with a pressure control reservoir according to the first embodiment of the invention.

Referring to the drawings, wherein like reference numbers refer to like parts in several views, particularly to FIG. 1, there is shown a brake system equipped with a pressure control reservoir 20 according to the first embodiment of the invention. The brake system, as referred to herein, is used with an automotive vehicle equipped with a so-called diagonal split system which includes two brake hydraulic circuits one of which controls the right front and the left rear wheel and the other of which controls the left front and the right rear wheel, but may be used with a front/rear split system.

The brake system includes a brake pedal 1 (i.e., a brake actuating member) to be depressed by a vehicle occupant or driver for applying the brakes to the vehicle. The brake pedal 1 is connected to a brake booster (also called a vacuum servo or servo unit) 2 which works to boost the pressure applied to a brake pedal 1.

The brake booster 2 is equipped with a pushrod which transmits the pressure, as enhanced by the brake booster 2, to a master cylinder (M/C) 3. The pushrod serves to push pistons installed in the master cylinder 3 to create a hydraulic pressure (which will also be referred to as a master cylinder pressure below). The master cylinder 3 is also connected to a master reservoir 3a. The mater reservoir 3a supplies the brake fluid to the master cylinder 3 or stores an excess of the brake fluid in the master cylinder 3. The brake pedal 1, the brake booster 2, and the master cylinder 3 function as a brake fluid pressure generator.

The mater pressure is transmitted through an ABS (Antilock Brake System) actuator to wheel cylinders 4 and 5 (i.e., brake force generators). For the brevity of illustration, FIG. 1 shows only one of two brake hydraulic circuits of the diagonal split system which leads to the right front wheel cylinder 4 and the left rear wheel cylinder 5, but however, the brake system of this embodiment is, as described above, also equipped with the second brake hydraulic circuit which leads to left front and right rear wheel cylinders. The second brake hydraulic circuit is identical in structure and operation with the first brake hydraulic circuit, as illustrated in FIG. 1, and explanation thereof in detail will be omitted here.

The brake system also includes a main hydraulic line A coupled to the master cylinder 3. The main hydraulic line A has disposed therein a differential pressure control valve 7 from which two branch lines: a branch line A1 and a branch line A2 extend. Specifically, the main hydraulic line A is made up of three sections: a hydraulic line A1 and two hydraulic branch lines A2. The hydraulic line A1 extends between the differential pressure control valve 7 and the master cylinder 3 and transmits the master cylinder pressure therebetween. One of the branch lines A2 (which will also be referred to as a first branch line below) extends between the differential pressure control valve 7 and the wheel cylinder 4 and transmits the master cylinder pressure therebetween. The other branch line A2 (which will also be referred to as a second branch line below) extends between the differential pressure control valve 7 and the wheel cylinder 5 and transmits the master cylinder pressure therebetween.

The differential pressure control valve 7 is operable in either of two modes: an open mode and a pressure-difference mode. Usually, the differential pressure control valve 7 is in the open mode. In the pressure difference mode, the differential pressure control valve 7 works to keep the pressure in the wheel cylinders 4 and 5 higher than that in the master cylinder 3 by a given level.

The first branch line A2 has installed therein a pressure-increasing valve 30 which controls the increasing of pressure of the brake fluid to be delivered to the wheel cylinder 4. Similarly, the second branch line A3 has installed therein a pressure-increasing valve 31 which controls the increasing of pressure of the brake fluid to be delivered to the wheel cylinder 5.

Each of the pressure-increasing valves 30 and 31 is implemented by a two-position valve which is opened or closed by an electronic control unit (ECU) 100 in a brake fluid pressure control mode. When opened, the pressure-increasing valves 30 and 31 deliver the master cylinder pressure or a hydraulic brake pressure, as produced by a pump 10 which will be described later in detail, to the wheel cylinders 4 and 5, respectively. Each of the pressure-increasing valves 30 and 31 is normally kept open when the brake system is not in the brake fluid pressure control mode (e.g., an antilock braking mode). Such a mode will also be referred to as a normal braking mode below.

The brake system also includes hydraulic lines B leading to the branch lines A2 between the pressure-increasing valve 30 and the wheel cylinder 4 and between the pressure-increasing valve 31 and the wheel cylinder 5, respectively. The hydraulic lines B also connect with a reservoir port 20B of the pressure control reservoir 20. The brake fluid in each of the wheel cylinders 4 and 5 is delivered to the pressure control reservoir 20 through the hydraulic lines B for controlling the skidding of the wheels of the vehicle, that is, prevent the wheel lock. The structure of the pressure control reservoir 20 will be described later in detail.

The hydraulic lines B have installed therein pressure-reducing valves 32 and 33, respectively, which are opened or closed by the ECU 100. Each of the pressure-reducing valves 32 and 33 is normally kept closed when the brake system is in the normal braking mode. When it is required to drain the brake fluid from the wheel cylinders 4 and 5 to the pressure control reservoir 20, the pressure-reducing valves 32 and 33 are opened by the ECU 100, respectively.

The brake system also includes hydraulic lines C and D. The hydraulic line C connects at an end thereof to a joint between the differential pressure control valve 7 and each of the hydraulic lines A2 and also at the other end to the reservoir port 20B of the pressure control reservoir 20. The reservoir port 20B is connected hydraulically to the inlet of the pump 10 through a portion of the hydraulic lines B and C. The brake fluid, as drained to the pressure control reservoir 20 in the antilock braking mode, is returned by the operation of the pump 10 back to the hydraulic line A through the above described portion of the hydraulic lines B and C to elevate the pressure in the wheel cylinders 4 and 5. The hydraulic line C has the pump 10, check valves 10a and 10b, and an accumulator 12 installed therein. The accumulator 12 is disposed downstream of the pump 10 and works to absorb pulsation of the brake fluid discharged by the pump 10. The hydraulic line D connects between a reservoir port 20A and the master cylinder 3. The pump 10 sucks the brake fluid from the hydraulic line A1 through the hydraulic line D and the pressure control reservoir 20 and discharges it to the hydraulic lines A2 through a portion of the hydraulic line B and the hydraulic line C, thereby increasing the pressure in the wheel cylinders 4 and 5.

The structure of the pressure control reservoir 20 will be described below with reference to FIGS. 2 and 3.

The pressure control reservoir 20 is used both in the antilock braking mode and in a flow rate control mode in which a flow rate of the brake fluid sucked from the master cylinder 3 to the pump 10 is so regulated as to elevate the pressure in the wheel cylinders 4 and 5 to a level higher than the master cylinder pressure. Such flow rate regulation is achieved by balancing between the master cylinder pressure and the pressure in a reservoir chamber 20C of the pressure control reservoir 20 and will be referred to a pressure regulating mode below.

The pressure control reservoir 20 is mounted in a housing 40 that serves as a shell of an ABS actuator. The housing 40 has a chamber 41 formed therein. The chamber 41 has the reservoir ports 20A and 20B formed in an inner wall thereof. The reservoir ports 20A and 20B will also be referred to below as a first and a second reservoir port, respectively. The inner wall of the chamber 41 also serves as a bulkhead of the reservoir chamber 20C.

The chamber 41 (i.e., the housing 40) has an inner shoulder 120 to define a first chamber 42 (which will also be referred to as a small-diameter chamber) and a second chamber 43 (which will also be referred to as a large-diameter chamber) which continues from and communicates with the first chamber 42. Specifically, the first chamber 42 extends from the bottom of the second chamber 43, in other words, is located more upstream of a flow of the brake fluid from the reservoir port 20A to the reservoir port 20B than the second chamber 43 is. The first chamber 42 is greater in depth, but smaller in diameter than the second chamber 43. The first chamber 42 has a longitudinal center line extending parallel to that of the second chamber 43. In the example of FIGS. 2 and 3, the longitudinal center line of the first chamber 42 is aligned with that of the second chamber 43. The reservoir ports 20A and 20B open into the first chamber 42 at locations different in depth from each other. The reservoir chamber 20C is formed within the second chamber 43.

The reservoir port 20A is formed in a portion of the inner wall of the first chamber 42 which is located deeper inside the inner wall than where the reservoir port 20B is formed, in other words, located more upstream of a flow of the brake fluid inputted from the reservoir port 20A than the reservoir port 20B is. The reservoir port 20A communicates between the hydraulic line D (i.e., a fluid inlet line) leading to the master cylinder 3 and the pump 10 and receives the pressure of the hydraulic pressure identical in level with the master cylinder pressure. The reservoir 20B is formed in the inner wall of the first chamber 42 and connects among the hydraulic lines B and D (i.e., fluid outlet lines) and the reservoir chamber 20C. The reservoir chamber 20C is defined by the inner wall of the second chamber 43 and a piston 22 which will be described later in detail. The reservoir chamber 20C stores therein the brake fluid flowing from the reservoir port 20A and also discharges it from the reservoir port 20B.

The first chamber 42 has disposed therein a valve assembly 21 which is made up of a pressure control piston 211, a ball valve 212, a valve seat 213, a filter unit 214, a ball spring 215, a pressure control spring 216, and O-rings 217 and 218.

The pressure control piston 211 is movable within the first chamber 42 and joined with the valve seat 213. The pressure control piston 211 has formed therein a hydraulic path 211a that is a portion of a hydraulic path communicating among the reservoir ports 20A and 20B and the reservoir chamber 20C. The pressure control piston 211 is made of a hollow cylinder equipped with a cavity 211b that is a portion of the hydraulic path 211a. The pressure control piston 211 also has a partition wall 211c which is located closer to the bottom of the first chamber 42 than the hydraulic path 211a is. The partition wall 211c defines a back chamber 42a between the hydraulic path 21 la and the bottom of the first chamber 42. The back chamber 42a communicates with an atmospheric pressure inlet 40a so that it is at the atmospheric pressure. The pressure control piston 211 has formed in an outer peripheral wall thereof a connecting path 211d which communicates between the reservoir port 20A and the cavity 211b. The connecting path 211d and the cavity 211b form the hydraulic path 211a. The valve seat 213 is partially fixed within the pressure control piston 211 by a crimped open end of the pressure control piston 211 which faces the reservoir chamber 20C. The pressure control piston 211 is designed to have an outer diameter identical with an inner diameter of a portion of the inner wall of the first chamber 42 which is in physical contact with the periphery of the pressure control piston 211. The pressure control piston 211 is movable within the first chamber 42 in slidable contact with the inner wall of the first chamber 42 in a depth-wise direction (i.e., the longitudinal direction of the pressure control reservoir 20).

The ball valve 212 works as a valve element and is disposed inside the cavity 21 lb. The ball valve 212 rests on an annular inner edge (i.e., a seat surface) of the valve seat 213 to close the hydraulic path 211a and is alternatively moved away from the valve seat 213 to open the hydraulic path 211a.

The valve seat 213 is made of a hollow cylindrical member which has formed therein the hydraulic path 213a that is a portion of a hydraulic path communicating among the reservoir port 20A, the reservoir port 203, and the reservoir chamber 20C. The hydraulic path 213a communicates between the hydraulic path 21 la of the pressure control piston 211 and the reservoir chamber 20C. The valve seat 213 has formed in an outer peripheral wall thereof a connecting path 213b which connects between the hydraulic path 213a and the reservoir port 20B. The valve seat 213 is secured to the pressure control piston 211 and has, as described above, the tapered or chamfered seat surface which is formed on the end thereof facing the pressure control piston 211 and on which the ball valve 212 is to be seated.

The valve assembly 21 (i.e., the valve seat 213 and the ball valve 212) constitutes a check valve. When the ball valve 212 rests on the seat surface of the valve seat 213, the check valve is closed.

The filter unit 214 includes a hollow cylindrical mesh whose ends have annular reinforcements attached thereto. The filter unit 214 is fit on the outer periphery of the pressure control piston 211 and covers the connecting path 211d. The filter unit 214 is, as clearly illustrated in FIGS. 2 and 3, located in an annular groove formed in the inner wall of the first chamber 42. The filter unit 214 works to avoid the intrusion of foreign objects, as contained in the brake fluid flowing from the master cylinder 3, into the pressure control reservoir 20.

The ball spring 215 is disposed inside the pressure control piston 211 to urge the ball valve 212 into contact with the seat surface of the valve seat 213. The pressure control spring 216 is disposed in the back chamber 42a to urge the pressure control piston 211 toward the reservoir chamber 20C.

The O-ring 217 is fit on a portion of the periphery of the pressure control piston 211 which is farther away from the reservoir chamber 20C than the connecting path 211d is. The O-ring 217 is compressed between the pressure control piston 211 and the inner wall of the first chamber 42 to create a hermetic seal between the hydraulic line D which is at the master cylinder pressure and the back chamber 42a which is at the atmospheric pressure. The O-ring 218 is fit in a groove formed in a portion of the outer periphery of the pressure control piston 211 which is closer to the reservoir chamber 20C than the connecting path 211d is. The O-ring 218 is compressed between the pressure control piston 211 and the inner wall of the first chamber 42 to create a hermetic seal between the hydraulic line D which is at the master cylinder pressure and the hydraulic paths B and C and between the hydraulic line D and the reservoir chamber 20C.

The piston 22 is disposed inside the second chamber 43. The piston 22 is made up of a piston body 221, an O-ring 222, a spring 223, and a cover 224.

The piston body 221 is movable in sliding contact with the inner wall of the second chamber 43. The piston body 221 has attached to an end thereof a pin 221a which extends into the first chamber 42 and is disposed within the hydraulic path 213a of the valve seat 213. The pin 221a may extend in alignment with the longitudinal center line (i.e. an axial direction) of the piston body 221. The pin 221a moves along with the piston body 221. The pin 221a has a length which protrudes into the first chamber 42 and is so selected as to retain the ball valve 212 at a given distance away from the seat surface of the valve seat 213 when the pressure control piston 211 is positioned closest to the reservoir chamber 20C, and the piston body 221 is positioned closest to the pressure control piston 211, in other words, when the piston body 221 is located in contact abutment with the inner shoulder of the housing 40 (i.e., the bottom of the second chamber 43).

The O-ring 222 is fit in an annular groove 221b formed in the outer periphery of the piston body 221.

The spring 223 is disposed between the piston body 221 and the cover 224 in contact with the piston body 221 to urge the piston body 221 toward the valve assembly 21, in other words, in a direction in which the volume of the reservoir chamber C decreases.

The cover 224 bears the pressure, as produced by the spring 223. The cover 224 is joined to the housing 40. Specifically, the housing 40 has an annular edge which defines an open end of the second chamber 43. The annular edge is crimped to hold a flange of the cover 224 to secure the cover 224 to the housing 40 tightly. The cover 224 has formed in the center thereof an air inlet 224a through which the atmospheric air is introduced into a back chamber 44 defined between the piston body 221 and the cover 224.

A stopper ring 23 is press-fit in an open end (i.e., an inlet) of the first chamber 42. The stopper ring 23 has a cavity 23a and is located coaxially with the valve assembly 21. The cavity 23a has an inner diameter smaller than an outer diameter of the valve seat 213, thereby stopping the valve assembly 21 from moving when an end of the valve seat 213 farther away from the ball valve 212 is brought into contact with the stopper ring 23.

The operation of the pressure control reservoir 20 will be described below with reference to FIGS. 2 and 3.

When the brake fluid pressure control mode is not yet entered before the brakes are applied to the wheels, the master cylinder pressure is not produced or at a low level, and the pump 10 is not activated. The pressure control piston 211 is, thus, placed closer to the reservoir chamber 20C, that is, at a position, as illustrated in FIG. 2. The ball valve 212 is located at the given distance away from the seat surface of the valve seat 213 to establish fluid communication between the hydraulic path 211a and the hydraulic path 213a.

Figure 2:
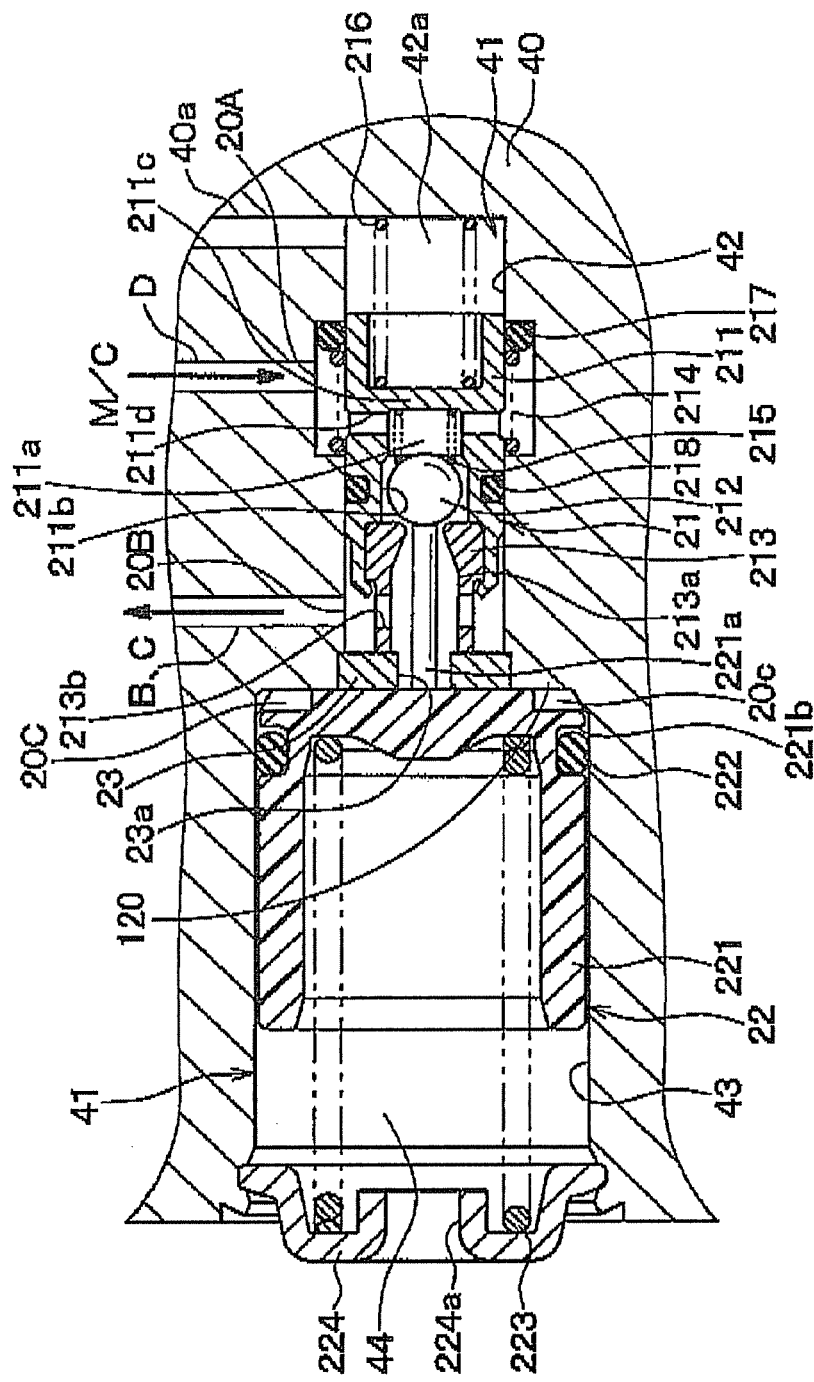
FIG. 2 is a partially longitudinal sectional view which illustrates the pressure control reservoir, as shown in FIG. 1, when a check valve is opened.
Figure 3:
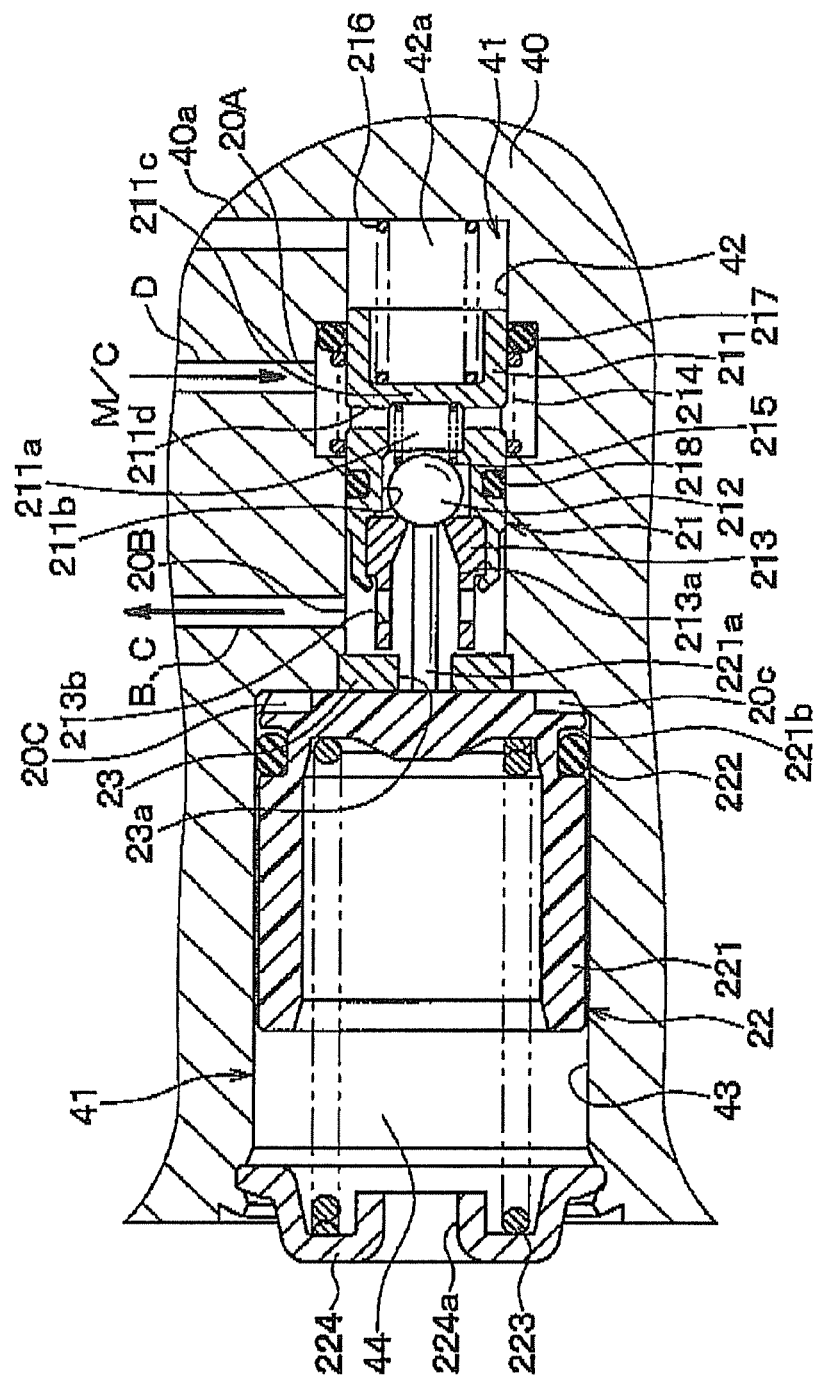
FIG. 3 is a partially longitudinal sectional view which illustrates the pressure control reservoir, as shown in FIG. 1, when a check valve is closed.

When the brake pedal 1 is depressed, so that the master cylinder pressure is elevated higher than a level at which the pressure on the left side of the pressure control piston 211, as viewed in FIGS. 2 and 3, (i.e., the pressure leading to the inlet of the pump 10) is balanced with the pressure, as produced by the pressure control spring 216, it will cause the pressure control piston 211 and the valve seat 213 to move right, as viewed in FIG. 3. In other words, the pressure control piston 211 and the valve seat 213 are pushed in the same direction as that in which the pin 221a presses the ball valve 212. Specifically, the movement of the pressure control piston 211 is established depending upon a relation among a difference between the master cylinder pressure and the pressure (i.e., the atmospheric pressure) in the back chamber 42a or the pressure leading to the inlet of the pump 10, the diameter of the pressure control piston 211, the diameter of the seat surface of the valve seat 213, and an elastic force produced by the pressure control spring 216 (or a spring constant of the pressure control spring 216). The valve assembly 21 works as a proportioning valve to move the seat surface of the valve seat 213 into contact with the ball valve 212 which is urged by the ball spring 215 toward the valve seat 213, thereby blocking the fluid communication between the hydraulic path 211a and the hydraulic path 213a completely.

The pressure control piston 211 and the valve seat 213, as described above, travel together to the right, as viewed in FIG. 3, in other words, the seat surface of the valve seat 213 moves, while the ball valve 212 is held from moving. With this arrangement, the level of pressure at which the piston body 221 starts to move is higher than the level of the master cylinder pressure at the end of movement of the pressure control piston 211, that is, the level of the master cylinder pressure when the check valve is closed. The check valve is, therefore, closed before the piston body 221 starts to move, thus permitting the volume of the brake fluid required to close the check valve to be decreased, which minimizes the uncomfortable feeling given to the driver when actuating the brakes.

When the pressure regulating mode is entered, for example, the brake pedal 1 has been depressed to apply the master cylinder pressure to the reservoir port 20A in a brake assist control mode, the actuation of the pump 10 will result in a drop in pressure at the inlet of the pump 10. This causes the pressure control piston 211 and the valve seat 213 to be moved to the left, as illustrated in FIGS. 2 and 3, so that the valve seat 213 contacts the stopper ring 23, thereby retaining the ball valve 212 away from the seat surface of the valve seat 213 to open the check valve slightly. The pump 10 then works to pressurize the brake fluid in the wheel cylinders 4 and 5 while keeping the pressure in the inlet of the pump 10 balanced with the pressure, as produced by the pressure control spring 216.

When the pump 10 is in a self-priming mode, for example, the pump 10 is actuated to suck the brake fluid to produce the braking force in the condition where the master cylinder pressure is not produced in a traction control mode or a lateral skid control mode, the ball valve 212 is placed away from the seat surface of the valve seat 213, so that the check valve is opened. The pump 10 is, therefore, operable to suck the brake fluid from the master cylinder 3 through the hydraulic paths 211a and 213a and pressurize the brake fluid in the wheel cylinders 4 and 5.

In the antilock braking mode, the brake fluid is drained from the wheel cylinders 4 and 5 to the reservoir chamber 20C through the hydraulic line B, so that the piston body 221 moves to the left, as viewed in FIGS. 2 and 3, along with the pin 221a pushing the ball valve 212. This causes the ball valve 212 to be seated on the seat surface of the valve seat 213, so that the check valve is closed. The pump 10 is, thus, operable to suck the brake fluid from the reservoir chamber 20C and discharge it to regulate the pressure in the wheel cylinders 4 and 5. After completion of the antilock braking mode, the pump 10 works to suck the brake fluid from the reservoir chamber 20C, so that the piston body 221 returns back to the right, as viewed in FIGS. 2 and 3, along with the pin 221a. The pin 221a then pushes the ball valve 212 to open the check valve, like before the start of the antilock braking mode.

As apparent from the above discussion, the pressure control reservoir 20 is equipped with the check valve which is closed when the master cylinder pressure is elevated and opened in the self-priming mode. Specifically, when the driver of the vehicle depresses the brake pedal 1 to produce the braking force, the valve seat 213 is moved to close the check valve. The level of pressure at which the piston body 221 starts to move is set higher than the level of the master cylinder pressure at the end of movement of the pressure control piston 211, that is, the level of the master cylinder pressure when the check valve is closed. The check valve is, therefore, closed before the piston body 221 starts to move, thus permitting the volume of the brake fluid required to close the check valve to be decreased, which minimizes the uncomfortable feeling given to the driver when actuating the brakes.

In a conventional pressure control reservoir equipped with a normally-open check valve, such as the one, as disclosed in the publication described in the introductory part of this application, an excessive rise in the master cylinder pressure may cause the pressure acting on a ball of the check valve to exceed the pressure, as produced by a spring in the reservoir, so that the check valve is opened. In contrast, the pressure control reservoir 20 of this embodiment is so engineered that the pressure control piston 211 is movable even if the pressure in the master cylinder 3 is undesirably elevated, thus permitting the check valve to be opened or closed.

The second embodiment will be described below with reference to FIG. 4. The same reference numbers, as employed in the first embodiment, will refer to the same parts, and explanation thereof in detail will be omitted here.

The valve assembly 21 of the pressure control reservoir 20 of this embodiment is made in the form of a spool valve.

Specifically, the valve assembly 21 consists of a pressure control piston 211 (i.e., a spool), a pressure control spring 216, and an O-ring 217.

The pressure control piston 211 is made of a cylindrical member with shoulders. Specifically, the pressure control piston 211 is, as clearly illustrated in FIG. 4, shaped to have large-diameter portions one of which has an outer peripheral surface serving as a valve surface which selectively hermetically close the reservoir ports 20A and 20B which are formed in the housing 40 and exposed to the first chamber 42. More specifically, the pressure control piston 211 includes a valve portion 211e (i.e., the large-diameter portion), a stopper 211f, a bulkhead (i.e., a partition wall) 211g, and a connecting portion 211h.

The valve portion 211e is located between the reservoir ports 20A and 20B and shaped to have an outer diameter substantially identical with the inner diameter of the first chamber 42. When the pressure control piston 211 is positioned at the left side, as viewed in FIG. 4, the valve surface (i.e., the outer peripheral surface) of the valve portion 21 1e opens the reservoir port 20A fully. Alternatively, when the pressure control piston 211 is moved to the right, as viewed in FIG. 4, the valve surface of the valve portion 21 1e closes the reservoir port 20A. Specifically, the valve portion 21 1e functions as a check valve to selectively open or close the reservoir port 20A.

The stopper 211f extends from the valve portion 211e in alignment therewith toward the reservoir chamber 20C and has an outer diameter smaller than that of the valve portion 211e. When the stopper 211f contacts the piston body 221, the stopper 211f serves to hold the valve assembly 21 from moving toward the reservoir chamber 20C. The stopper 221f has formed between the outer periphery thereof and the inner wall of the first chamber 42 a gap through which establish fluid communication between the reservoir chamber 20C and the hydraulic lines B and C leasing to the inlet of the pump 10. A stopper, such as the stopper ring 23 in FIG. 2, with which the stopper 211f is brought into abutment when the pressure control piston 211 is moved toward the reservoir chamber 20C may be disposed on the end of the piston body 211.

The bulkhead 211g isolates the reservoir port 20A from the back chamber 42a and functions, like the partition wall 211c in the first embodiment. The bulkhead 211g is shaped to have an outer diameter identical with the inner diameter of the first chamber 42.

The connecting portion 211h is a member connecting between the valve portion 211e and the bulkhead 211g. The connecting portion 211h is shaped to have an outer diameter smaller than those of the valve portion 211e and the bulkhead 211g. The connecting portion 211h forms a back chamber 42b between the outer periphery thereof and the inner wall of the first chamber 42. When the valve assembly 21 is positioned on the left side, as viewed in FIG. 4, the back chamber 42b communicates with the reservoir port 20A.

The pressure control spring 216 and the O-ring 217 function like in the first embodiment, and explanation thereof in detail will be omitted here.

The housing 40 has formed therein a hydraulic path 42c which extends from the back chamber 42b to the reservoir chamber 20C.

The operation of the pressure control reservoir 20 will be described below with reference to FIGS. 4 to 6.

When the brake fluid pressure control mode is not yet entered before the brakes are applied to the wheels, the master cylinder pressure is not produced, and the pump 10 is not activated. The pressure control piston 211 is, thus, placed closer to the reservoir chamber 20C, that is, at a position, as illustrated in FIG. 4. The valve surface of the valve portion 21 1e is located away from the reservoir port 20A, thereby establishing fluid communication between the hydraulic line D and the back chamber 42b, so that the hydraulic line D leads to the hydraulic path 42c.

Figure 4:
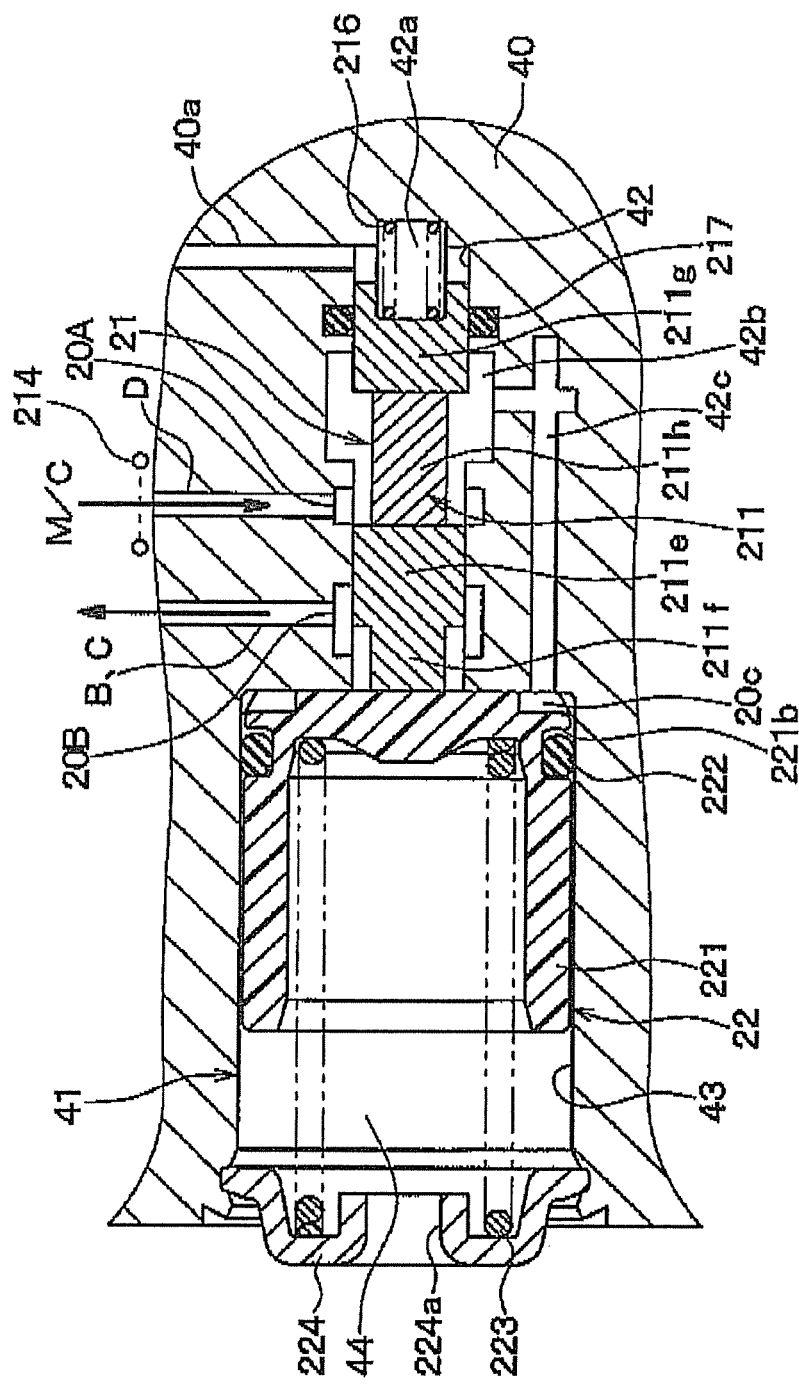
FIG. 4 is a partially longitudinal sectional view which illustrates a pressure control reservoir of the second embodiment when a check valve is opened.
Figure 5:
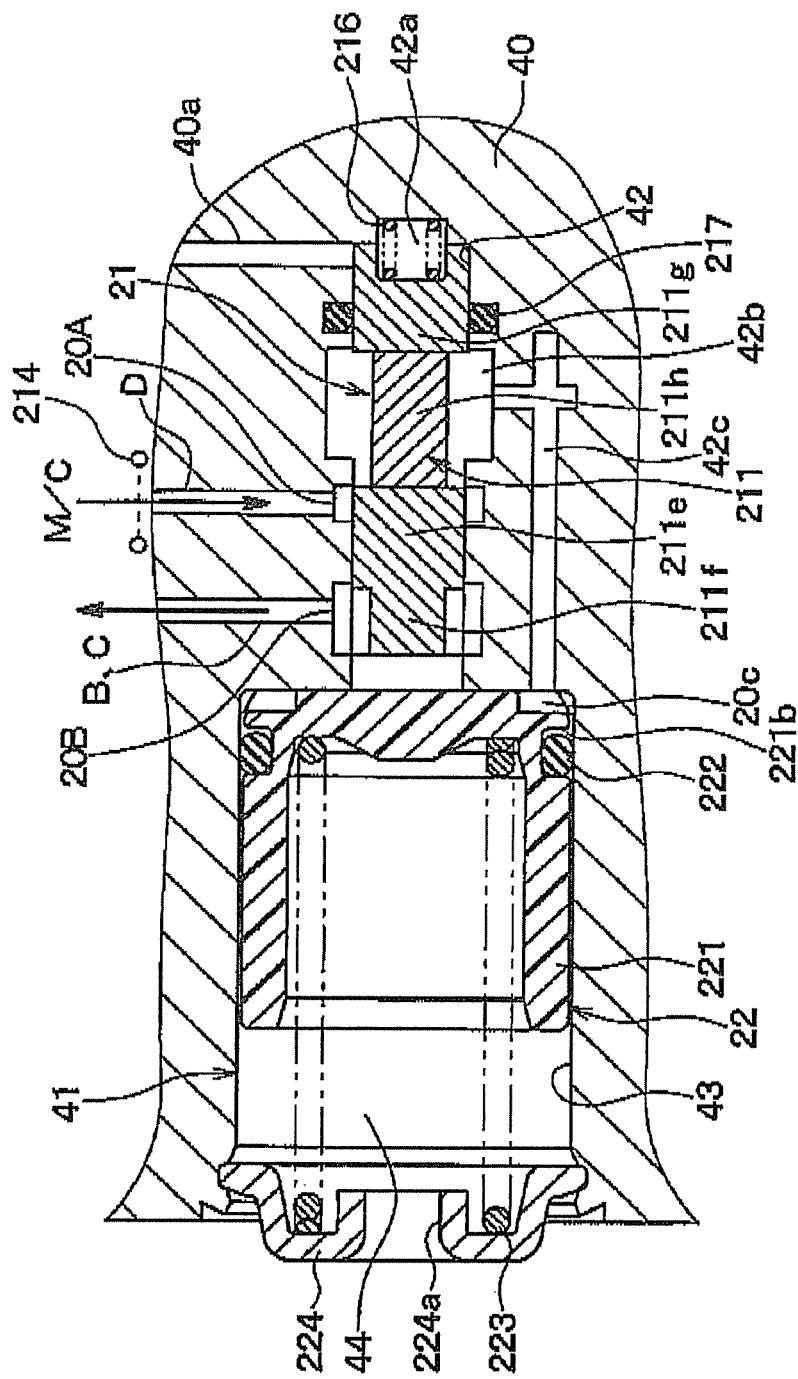
FIG. 5 is a partially longitudinal sectional view which illustrates a pressure control reservoir of the second embodiment when a check valve is closed.

When the brake pedal 1 is depressed, so that the master cylinder pressure is elevated higher than a level at which the pressure on the left side of the pressure control piston 211, as viewed in FIG. 4, (i.e., the pressure leading to the inlet of the pump 10) is balanced with the pressure, as produced by the pressure control spring 216, it will cause the pressure control piston 211 to move right, as viewed in FIG. 5. Specifically, the movement of the pressure control piston 211 is established depending upon a relation among a difference between the master cylinder pressure and the pressure (i.e., the atmospheric pressure) in the back chamber 42a or the pressure leading to the inlet of the pump 10, the diameter of the pressure control piston 211, and an elastic force produced by the pressure control spring 216 (or a spring constant of the pressure control spring 216). The valve assembly 21 works as a spool valve to move the valve surface of the valve portion 211e. when the pressure control piston 211 moves to the right, as viewed in FIG. 5, the valve surface of the valve portion 211e hermetically closes the reservoir port 20A.

The pressure control piston 211, as described above, travels together to the right, as viewed in FIG. 5. With this arrangement, the level of pressure at which the piston body 221 starts to move is set higher than the level of the master cylinder pressure at the end of movement of the pressure control piston 211, that is, the level of the master cylinder pressure when the check valve is closed. The check valve is, therefore, closed before the piston body 221 starts to move, thus permitting the volume of the brake fluid required to close the check valve to be decreased, which minimizes the uncomfortable feeling given to the driver when actuating the brakes.

When the pressure regulating mode is entered, for example, the brake pedal 1 has been depressed to apply the master cylinder pressure to the reservoir port 20A in the brake assist control mode, the actuation of the pump 10 will result in a drop in pressure at the inlet of the pump 10. This causes the pressure control piston 211 to be moved to the left, as illustrated in FIG. 4, so that the valve surface of the valve portion 21 1e moves to open the reservoir port 20A slightly, thereby enabling the brake fluid to be delivered from the master cylinder 3 to the pump 10. The pump 10 then works to pressurize the brake fluid in the wheel cylinders 4 and 5 while keeping the pressure in the inlet of the pump 10 balanced with the pressure produced by the pressure control spring 216.

When the pump 10 is in the self-priming mode, the valve surface of the valve portion 21 1e is located away from the reservoir port 20A, so that the check valve is opened. The pump 10 is, therefore, operable to suck the brake fluid from the master cylinder 3 through the hydraulic path 42c and pressurize the brake fluid in the wheel cylinders 4 and 5.

Figure 6:
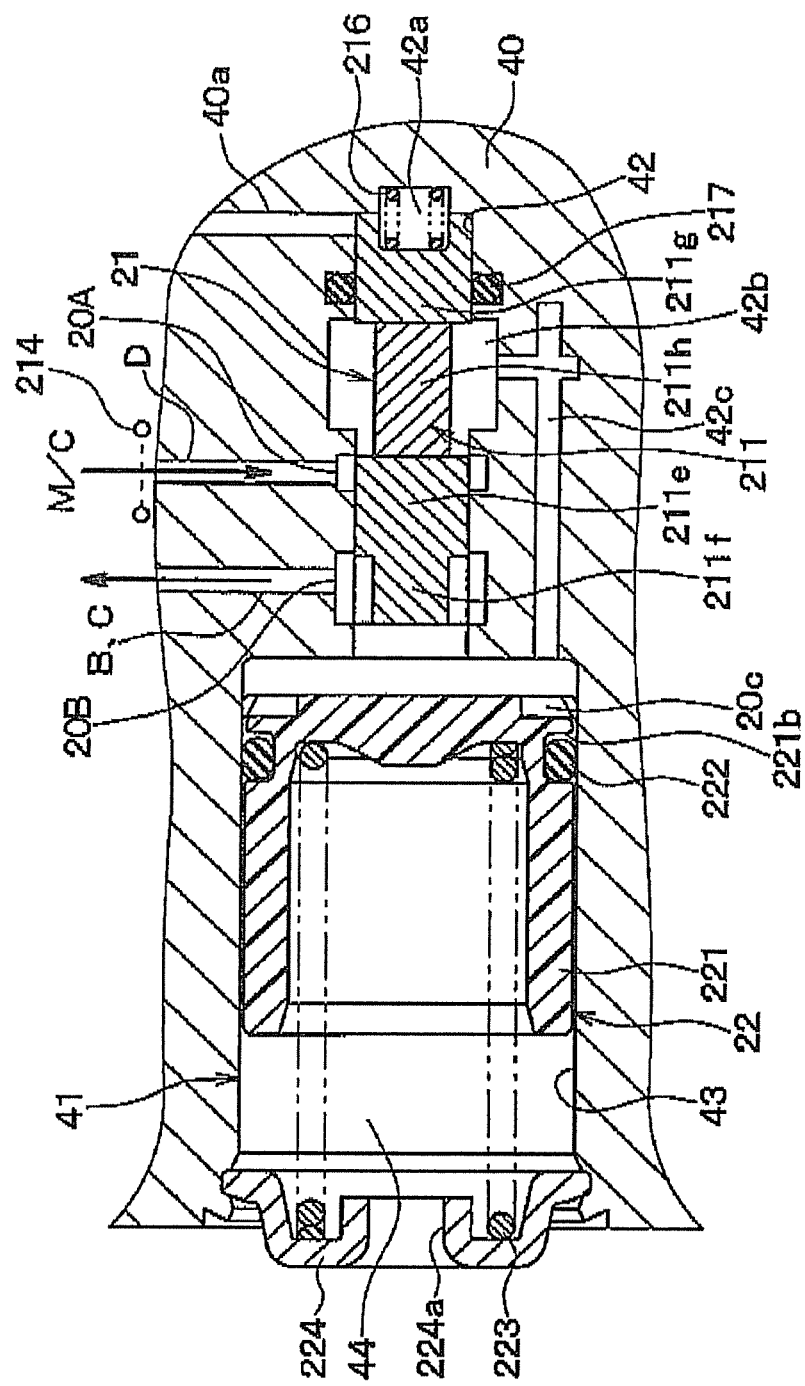
FIG. 6 is a partially longitudinal sectional view which illustrates a pressure control reservoir of the second embodiment in an antilock braking mode.

In the antilock braking mode, the brake fluid is, as illustrated in FIG. 6, drained from the wheel cylinders 4 and 5 to the reservoir chamber 20C through the hydraulic line B, so that the piston body 221 moves to the left, as viewed in FIG. 6. The pressure at which the pressure control piston 211 is moved by the pressure control spring 216 to the left, as viewed in FIG. 6, is set lower than that at which the piston body 221 starts to move, thus causing the hydraulic pressure in the reservoir chamber 20C to move the pressure control piston 211 to the right, so that the valve surface of the valve portion 211e closes the reservoir port 20A. The pump 10 then works to suck the brake fluid from the reservoir chamber 20C and discharge it to regulate the pressure in the wheel cylinders 4 and 5. After completion of the antilock braking mode, the pump 10 works to suck the brake fluid from the reservoir chamber 20C, so that the piston body 221 returns back to the right, as viewed in FIG. 6. The pressure control piston 211, then, returns back to the position at which the pressure control piston 211 is located before the start of the antilock braking mode, so that the check valve is opened.

As apparent from the above discussion, the pressure control reservoir 20 is equipped with the valve assembly 21 designed to have the pressure control piston 211 functioning as the spool valve. Specifically, when the driver of the vehicle depresses the brake pedal 1 to produce the braking force, the valve surface of the valve portion 211e is moved to close the check valve. This offers the same advantage as in the first embodiment. The valve surface of the valve portion 211e which is placed in contact with the inner wall of the first chamber 42 and opens or closes the reservoir port 20A is wider than the seat surface of the valve seat 213 on which the ball valve 212 rests and thus have an increased wear resistance. The structure of the pressure control reservoir 20 eliminates the need for installation of the ball valve 212 in the pressure control piston 211, thus permitting the valve assembly 21 to be reduced in size, which also permits the overall size of the pressure control reservoir 20 to be decreased.

The third embodiment will be described below with reference to FIGS. 7 and 8 which is different in structure of the valve assembly 21 from the first embodiment. The same reference numbers, as employed in the first embodiment, will refer to the same parts, and explanation thereof in detail will be omitted here.

Figure 7:
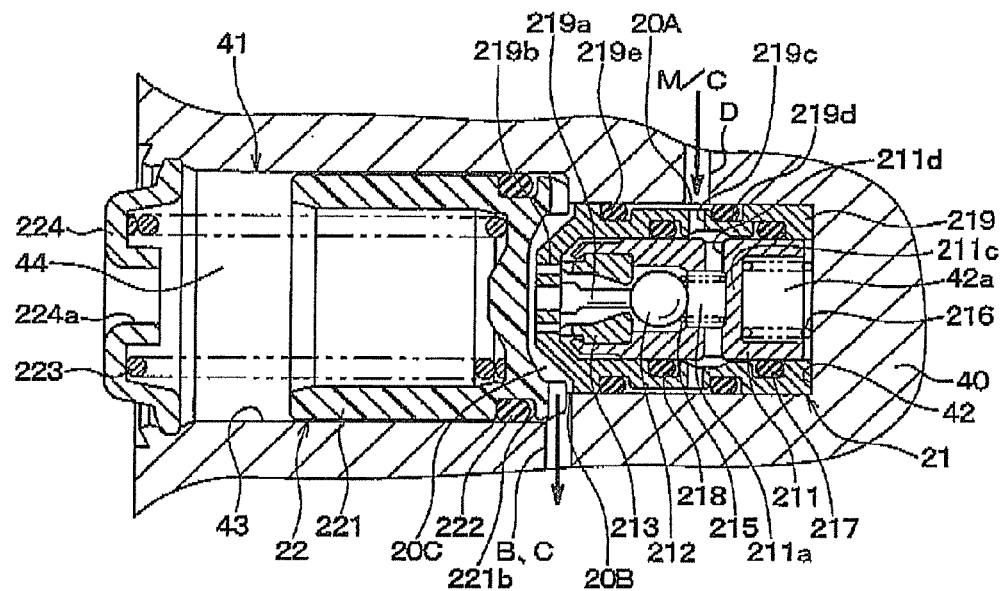
FIG. 7 is a partially longitudinal sectional view which illustrates a pressure control reservoir of the third embodiment when a check valve is opened.
Figure 8:
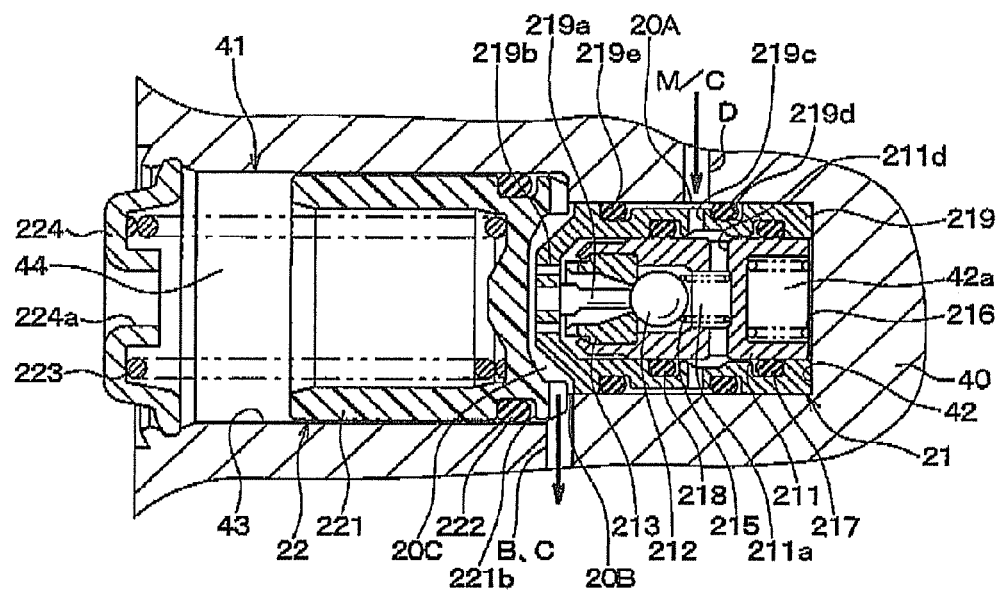
FIG. 8 is a partially longitudinal sectional view which illustrates a pressure control reservoir of the third embodiment when a check valve is closed.

The pressure control reservoir 20, as clearly illustrated in FIG. 7, has the valve assembly 21 constructed as a single unit. Specifically, the valve assembly 21 includes a casing 219, a pressure control piston 211, a ball valve 212, and a valve seat 213. The pressure control piston 211, the ball valve 212, and the valve seat 213 are disposed in the casing 219. The casing 219 is made of a hollow cylindrical member with a closed bottom. Within the casing 219, the valve seat 213 is disposed with an end thereof facing the bottom of the casing 219. The partition wall 211c of the pressure control piston 211 is oriented toward an open end of the casing 219. The casing 219 is disposed in the first chamber 42 with the open end thereof placed in contact with the bottom of the first chamber 42. The casing 219 has an outer peripheral surface placed in contact with the inner wall of the first chamber 42. The pressure control piston 211 is movable in slidable contact with the inner peripheral surface of the casing 219.

The casing 219 has a pin 219a arrayed in alignment with the longitudinal center line thereof. The pin 219a works to push the ball valve 212. The pin 219a is a component of the valve assembly 21 which is separate from the piston body 221. The casing 219 has connecting paths 219b formed in the bottom thereof. The connecting paths 219b are arranged at regular or equi-intervals away from each other around the pin 219a. The connecting paths 219b communicate between the reservoir chamber 20C and an inner chamber of the casing 219. The casing 219 also has connecting paths 219c formed in the outer periphery thereof. The connecting paths 219c communicate between the reservoir port 20A and the connecting path 211d formed in the pressure control piston 211. The casing 219 has an inner diameter increasing near the connecting paths 219c to form a gap between the outer periphery of the pressure control piston 211 and the inner wall of the casing 219. This ensures fluid communication between the connecting path 211d and the reservoir port 20A when the pressure control piston 211 moves in the casing 219.

The O-rings 217 and 218 are fit on the outer periphery of the pressure control piston 211 and compressed between the pressure control piston 211 and the inner wall of the casing 219. The casing 219 has O-rings 219d and 219e fit on the outer periphery thereof. The O-ring 219d is located farther away from the reservoir chamber 20C than the connecting paths 219c are. The O-ring 219d is compressed between the casing 219 and the inner wall of the first chamber 42 to create a hermetic seal between the hydraulic line D which is at the master cylinder pressure and the back chamber 42a which is at the atmospheric pressure. The O-ring 219e is, like the O-ring 219d, fit in a groove formed in a portion of the outer periphery of the casing 219 which is closer to the reservoir chamber 20C than the connecting paths 219c are. The O-ring 219e is compressed between the casing 219 and the inner wall of the first chamber 42 to create a hermetic seal between the hydraulic line D which is at the master cylinder pressure and the hydraulic paths B and C and between the hydraulic line D and the reservoir chamber 20C.

As apparent from the above discussion, the valve assembly 21 is constructed as a unit. In operation of the pressure control reservoir 20, before the brake pedal 1 is depressed, the pressure control piston 211 is located at the right side, as viewed in FIG. 7, so that the pin 219a retains the ball valve 212 away from the valve seat 213, thereby opening the check valve (i.e., the valve assembly 21). When the master cylinder pressure is elevated, it will cause the pressure control piston 211 to be, as illustrated in FIG. 8, moved to the right in contact with the inner wall of the casing 219. This causes the ball valve 212 to be seated on the seat surface of the valve seat 213, so that the check valve is closed.

The pressure control reservoir 20 of this embodiment is different from the one in the first embodiment in that the pressure control piston 211 slides in contact with the inner wall of the casing 219, and the pin 219a which retains and moves the ball valve 212 is secured to the casing 219. Other arrangements are substantially identical with those in the first embodiment. The valve assembly 21 is constructed as a unit, thus facilitating the ease with which the valve assembly 21 is installed in the pressure control reservoir 20.

Figure 9:
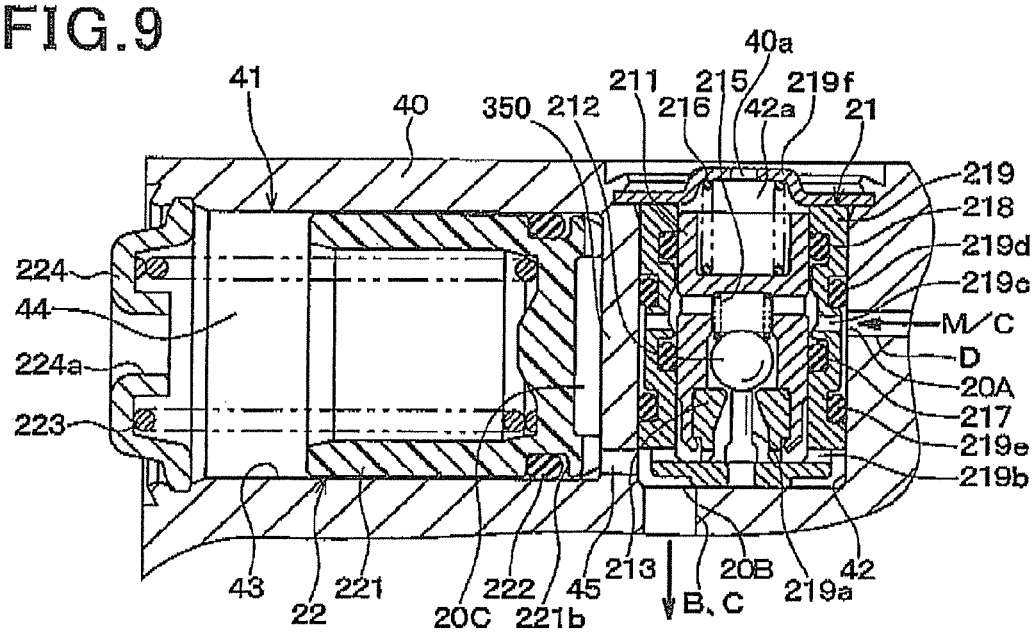
FIG. 9 is a partially longitudinal sectional view which illustrates a pressure control reservoir of the fourth embodiment when a check valve is opened.
Figure 10:
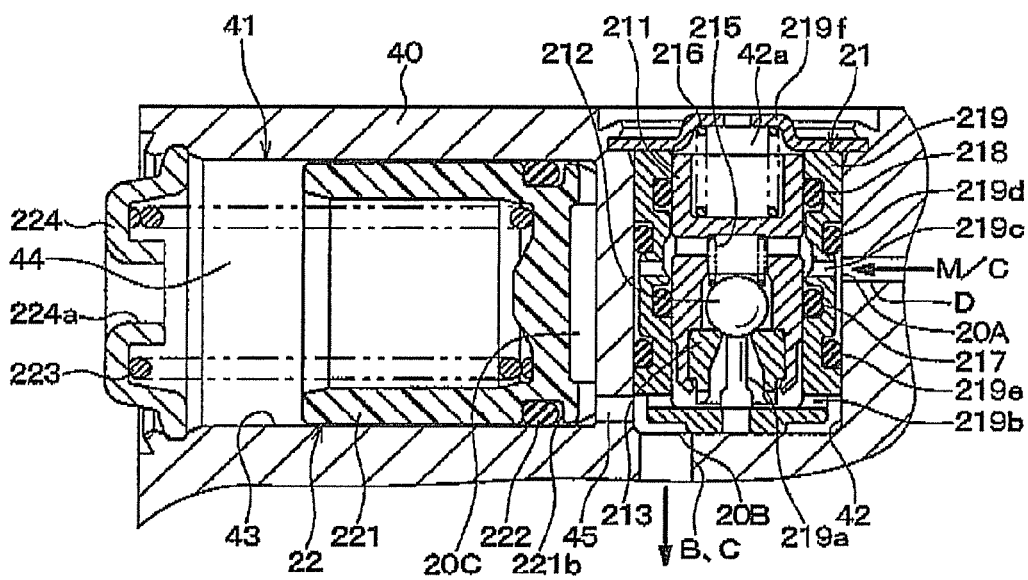
FIG. 10 is a partially longitudinal sectional view which illustrates a pressure control reservoir of the fourth embodiment when a check valve is closed.

The fourth embodiment will be described below with reference to FIGS. 9 and 10 which is different from the third embodiment in that the valve assembly 21 is oriented to have the longitudinal center line arranged in misalignment with that of the reservoir chamber 20C. The same reference numbers, as employed in the first to third embodiments, will refer to the same parts, and explanation thereof in detail will be omitted here.

The valve assembly 21 is, like in the third embodiment, constructed as a unit. The valve assembly 21 is, as can be seen from FIGS. 9 and 10, disposed to have the longitudinal center line extending substantially perpendicular to that of the reservoir chamber 20C (i.e., the second chamber 43). Specifically, the first chamber 42 and the second chamber 43 are formed to be separate from each other in the housing 40. More specifically, the housing 40 has a bulkhead 350 which isolates the first chamber 42 from the second chamber 43. The second chamber 43 has the longitudinal center line aligned with the longitudinal center lien of the pressure control reservoir 20. The first chamber 42 is oriented to have the longitudinal center line extending perpendicular to that of the second chamber 43. The bulkhead 350 has formed therein a connecting path 45 which communicates between the bottom of the second chamber 43 (i.e., the reservoir chamber 20C) and the side of the first chamber 42. The connecting path 45, as can be seen from FIGS. 9 and 10, opens into the first chamber 42 near the bottom thereof.

The casing 219 has the connecting paths 219b formed in a portion of the side wall thereof which is close to the bottom. For example, the connecting paths 219b extend through a boundary between the side wall ad the bottom of the casing 210. The connecting paths 219b communicate between a portion of the inner chamber of the casing 219 close to the bottom and the first chamber 42 located outside the casing 219. The cover 219f is disposed in the housing 40. Specifically, the cover 219f is so joined to the housing 40 as to close an open end of the first chamber 42. The joining of the cover 219f is achieved by crimping the open end of the first chamber 42 (i.e., an annular edge of the housing 40 which defines the open end of the first chamber 42). The cover 219f retains the valve assembly 21 inside the housing 40 (i.e., the first chamber 42). The reservoir ports 20A and 20B are different in location from the ones in the third embodiment. Other arrangement are identical with those in the third embodiment, and explanation thereof in detail will be omitted here.

As apparent from the above discussion, the valve assembly 21 is constructed as a unit. The valve assembly 21 is oriented to have the longitudinal center line extending non-parallel to that of the reservoir chamber 20C. In operation of the pressure control reservoir 20, when the master cylinder pressure is elevated, the pressure control piston 211 is moved upward, as viewed in FIG. 10 to close the check valve. The other operation of the pressure control reservoir 20 is substantially identical with that in the third embodiment, and explanation thereof in detail will be omitted here.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The pressure control reservoir 20 of each of the embodiments has the atmospheric pressure inlet 40a through which the atmospheric pressure is introduced into the back chamber 42a, however, may be so designed that the brake fluid which is at the atmospheric pressure is inputted to the back chamber 42a. For instance, the back chamber 42a may be connected to the master reservoir 3a so that the back chamber 42a is exposed to the brake fluid at the atmospheric pressure. In other words, the back chamber 42a connects with the master reservoir 3a through a closed loop, thus preventing the brake fluid, having entered the first chamber 42 from the reservoir chamber 20A and then leaked through the O-ring 217, from flowing outside the pressure control reservoir 20.

In each of the first to third embodiments, the first chamber 42 is shaped to have the longitudinal center line extending in alignment with that of the second chamber 43, but however, the first and second chambers 42 and 43 may be designed to have the longitudinal center lines offset from each other in a radius direction thereof, in other words, extending parallel to each other.

The valve assembly 21 of the fourth embodiment is constructed as a unit, which facilitates the ease with which the valve assembly 21 is installed in the pressure control reservoir 20, but however, may be designed not to be a unit by securing the pin 219a to the bottom of the first chamber 42 (i.e., the inner wall of the housing 40) to be separate from other parts of the valve assembly 21.

What is claimed is:

1. A pressure control reservoir for a vehicle equipped with a brake system which includes a brake actuating member, a brake fluid pressure generator, and a braking force generator, the brake fluid pressure generator working to elevate pressure of brake fluid in response to an operation of the brake actuating member, the brake force generator being coupled to the brake fluid pressure generator through a main hydraulic line and working to produce a braking force to be exerted on a wheel in response to the elevated pressure of brake fluid, as provided by the brake fluid pressure generator, the pressure control reservoir comprising:

a housing;

a first reservoir port which is formed in the housing and to which the brake fluid is inputted from the brake fluid pressure generator through a fluid inlet line;

a second reservoir port which is formed in the housing and leads to an inlet of a pump through a fluid outlet line;

a reservoir chamber which is formed in the housing and is to communicate with the fluid inlet line and the fluid outlet line, the reservoir chamber working to store the brake fluid and selectively establishing fluid communication with the inlet of the pump through the second reservoir port, the pump serving to suck the brake fluid from the reservoir chamber and discharge the brake fluid to the brake force generator;

a housing chamber which is formed in the housing and into which the first reservoir port and the second reservoir port open, the first reservoir port selectively establishing fluid communication of the reservoir chamber with the fluid inlet line, the second reservoir port selectively establishing fluid communication of the reservoir chamber with the fluid outlet line;

a hydraulic path through which the brake fluid flows from the fluid inlet line to the reservoir chamber;

a valve assembly which is disposed in the housing chamber and works as a check valve, the valve assembly including a valve and a valve seat with a seat surface to selectively block the hydraulic path; and a reservoir piston which includes a piston body which is movable to change a volume of the reservoir chamber and a spring which is located farther away from the reservoir chamber than the piston body is and urges the piston body so as to decrease the volume of the reservoir chamber, wherein when the brake fluid pressure generator produces no pressure of the brake fluid, the valve seat is located away from the valve to open the check valve, thereby opening the hydraulic path, wherein when the brake fluid pressure generator elevates the pressure of the brake fluid, and the pump is at rest, the valve seat is moved in response to the elevated pressure of the brake fluid to close the check valve, thereby blocking the hydraulic path;

wherein the housing chamber includes a first chamber which leads to the first reservoir port and in which the valve assembly is disposed and a second chamber in which the reservoir piston is disposed, wherein the valve assembly includes a pressure control piston which is movable in the first chamber and in which a portion of the hydraulic path is formed, the valve seat which is secured to a portion of the pressure control piston which faces the reservoir piston, in which a portion of the hydraulic path is formed, and has the seat surface formed thereon, and the valve which is disposed inside the portion of the hydraulic path in the pressure control piston and selectively rests on the seat surface of the valve seat to block the hydraulic path, the valve and the valve seat serving as the check valve, further including a pin disposed in the hydraulic path, and wherein when the brake fluid pressure generator produces no pressure of the brake fluid, the pin retains the valve away from the seat surface of the valve seat to open the check valve, thereby opening the hydraulic path, when the brake fluid pressure generator elevates the pressure of the brake fluid, and the pump is at rest, the pressure control piston being moved along with the valve seat toward the valve, so that the valve rests on the seat surface of the valve seat in response to the pressure of the brake fluid to close the check valve, thereby blocking the hydraulic path; and the pressure control piston defines a back chamber and the hydraulic path within the housing chamber.

2. A pressure control reservoir as set forth in claim 1, wherein the housing chamber has an inner shoulder which defines the first chamber and the second chamber continuing from the first chamber, the first chamber and the second chamber having longitudinal center lines aligned with each other, the first chamber being located more upstream of a flow of the brake fluid from the first reservoir port to the second reservoir port than the second chamber is.

3. A pressure control reservoir as set forth in claim 1, wherein the valve assembly is made as a single unit which includes a casing in which the pressure control piston, the valve seat, and the valve are disposed, the casing having an inner wall with which the pressure control piston is movable in slidable contact and the pin secured thereto.

4. A pressure control reservoir as set forth in claim 1, wherein the housing chamber has an inner shoulder which defines the first chamber and the second chamber continuing from the first chamber, the first chamber and the second chamber having longitudinal center lines aligned with each other, the first chamber being located more upstream of a flow of the brake fluid from the first reservoir port to the second reservoir port than the second chamber is, wherein the first chamber has an inner peripheral wall in which the first reservoir port is formed and also has the valve assembly disposed therein, the second chamber having the reservoir piston disposed therein, and wherein when the brake fluid pressure generator produces no pressure of the brake fluid, the pressure control piston is located close to the reservoir piston, so that the valve portion opens the first reservoir port, meaning that the check valve is opened, when the brake fluid pressure generator elevates the pressure of the brake fluid, and the pump is at rest, the pressure control piston being moved away from the reservoir piston, so that the valve portion closes the first reservoir port, meaning that the check valve is closed.

5. The pressure control reservoir as set forth in claim 1, wherein an urging member is disposed on a surface of the pressure control piston within the back chamber and works to urge the pressure control piston toward the reservoir chamber.

6. The pressure control reservoir as set forth in claim 1, wherein the valve assembly has a cavity in which the valve is disposed, wherein the pressure control piston has a connecting path which communicates between the first reservoir part and the cavity, and wherein a sealing member is disposed on a portion of an outer periphery of the pressure control piston which is an opposite side of the connecting path to the reservoir chamber, the sealing member being compressed between the pressure control piston and an inner wall of the first chamber.

7. The pressure control reservoir as set forth in claim 1, wherein the back chamber communicates with an atmospheric pressure inlet so that the back chamber is at the atmospheric pressure.

8. The pressure control reservoir as set forth in claim 1, wherein the back chamber is sealed from the hydraulic path.

9. A pressure control reservoir as set forth in claim 1, wherein the housing chamber includes the first chamber and the second chamber continuing from the first chamber, the first chamber and the second chamber having longitudinal center lines aligned with each other, wherein the first chamber has an inner peripheral wall in which the first reservoir port is formed and also has the valve assembly disposed therein, the second chamber having the reservoir piston disposed therein, and wherein when the brake fluid pressure generator produces no pressure of the brake fluid, the pin holding the pressure control piston and the valve seat away from the valve to open the check valve, thereby opening the hydraulic path, when the brake fluid pressure generator elevates the pressure of the brake fluid and the pump is at rest, the pressure control piston and the valve seat being moved toward the valve, so that the valve rests on the seat surface of the valve seat in response to the pressure of the brake fluid to close the check valve, thereby blocking the hydraulic path.

10. A pressure control reservoir as set forth in claim 9, wherein the valve assembly is made as a single unit which includes a casing in which the pressure control piston, the valve seat, and the valve are disposed, the casing having an inner wall with which the pressure control piston is movable in slidable contact and the pin secured thereto.

* * * * *